May 16, 1933.  C. F. CLEMENS ET AL  1,909,612
VEHICLE SPRING
Filed Oct. 23, 1928
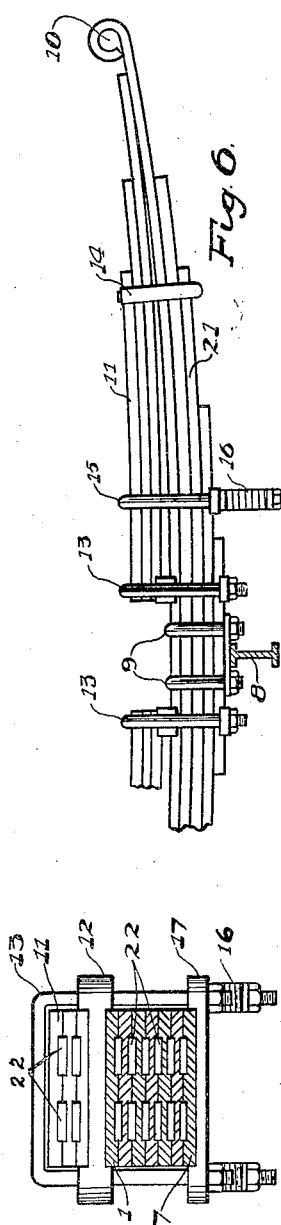
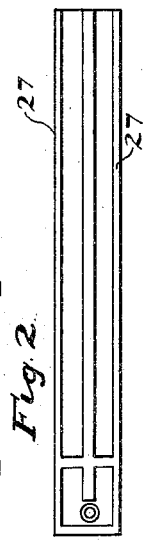
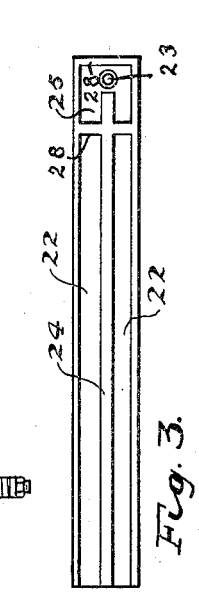
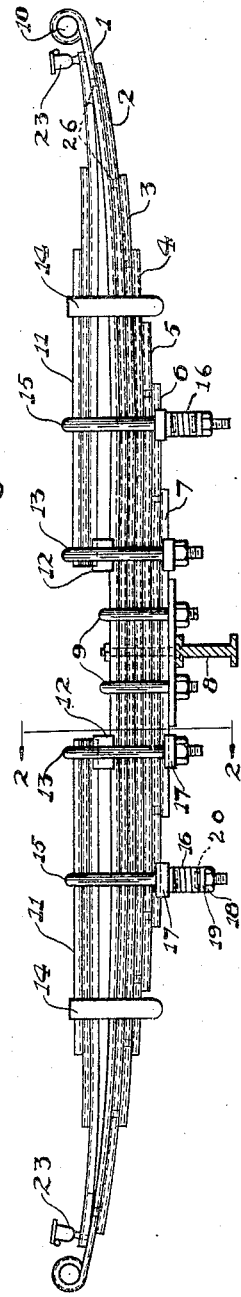
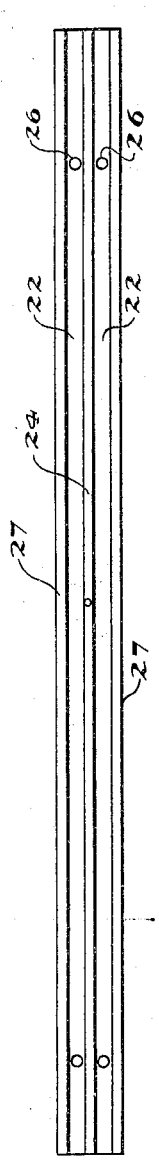
INVENTOR
Clarence F. Clemens
Gilbert V. Stenker
ATTORNEY Patented May 16, 1933

1,909,612

UNITED STATES PATENT OFFICE

CLARENCE F. CLEMENS AND ALBERT H. KEMPER, OF DAYTON, OHIO

VEHICLE SPRING

Application filed October 23, 1928. Serial No. 314,467.

This invention relates to improvements in vehicle springs, having particular reference to springs for motor vehicles such as automobiles and trucks, and being a development of the improved spring construction set forth in our copending application for Letters Patent, Serial Number 306,949, filed September 19, 1928.

The main object attained consists in an elliptical, or semi-elliptical spring, as herein shown and described, in which the usual characteristics of semi-elliptical springs are combined with improved means for lubricating the springs and means for snubbing or resisting the action of the springs in their rebound movement. The improved springs combine the structure for effecting these functions in a simple, relatively inexpensive, integral spring assembly having the general appearance of ordinary semi-elliptical springs.

The improved springs including the snubber elements and lubricating means are adaptable for standard spring construction, and the snubbing elements being also adaptable, independently of the lubricating means, for use on vehicles equipped with ordinary elliptical, or semi-elliptical springs, it being contemplated to furnish the springs for this trade as an accessory.

In the accompanying drawing which serves for illustrating the invention:

Fig. 1 is a view in side elevation of the improved spring showing its relation to the front axle of an automobile;

Fig. 2 is a view of the spring in cross section on line 2—2 of Fig. 1;

Figs. 3 and 4 are detail views of spring parts;

Fig. 5 is an end view of the part shown in Fig. 4;

Fig. 6 is a view in side elevation of an ordinary semi-elliptic spring having the snubber elements applied thereto.

As shown in Figs. 1-2, the improved spring consists of the spring laminations 1—7 inclusive arranged in their usual relation and supported on the front axle 8 of the vehicle by U-bolts 9. Eyelets 10 in the end of the spring leaf or blade 1 serve in the usual relation for connecting the spring to the shackles for connecting the same to the body structure of the vehicle.

The snubber elements as here shown, consist in opposite spring assemblies each comprising, as here shown, three spring leaves 11 fulcrumed at their inner ends on a block 12 supported on the upper spring leaf blade 1 and secured by U-bolts 13.

The outer ends of the snubbers float free and are retained in aligned relation with the lower section of the spring by straddle straps or yokes 14. Intermediate their ends the snubbers are tensioned by U-bolts 15, the tensioning being variable according to the weight carried on the spring.

The U-bolts 15 are of the required length for receiving at their open ends compression springs 16 interposed between plates 17, resting against the lower face of the spring section 1—7, and nuts and washers 18—19 at their lower ends, washers 19 being provided with bosses 20, as indicated in dotted outline in Fig. 1, extending into the lower ends of springs 16 and acting to prevent lateral displacement thereof.

Springs 16 are normally under tension and accordingly expand in the downward action of the spring 1—7. Thus at the beginning of the rebound action of spring 1—7 springs 16 act instantly with springs 11 to resist, or snub, the rebound action of spring 1—7. The relative tension of springs 11—16 is such that springs 16 act as shock absorbers in the rebound action, the combined spring action in the rebound being free of abruptness, thus effecting the smooth and easy riding qualities of the car attained by the improved spring construction.

The snubber tensioning bolts 15 are located well toward the axle 8 the normal tensioning of springs 11 being exerted upon the spring 1—7. In the rebound action of the spring the snubbers together with springs 16 resist the upward movement to the end of the vibrations, thus effecting evener riding qualities of the vehicle.

In the modified spring construction illustrated in Fig. 6 the semi-elliptic spring 21 is of the usual construction. The action of the snubber springs 11 and shock absorbing springs 16 as applied to ordinary springs is similar to that described in connection with Fig. 1.

The means for lubricating the spring of the construction illustrated in Figs. 1-5 consists in forming longitudinally extended lubricating grooves in the faces of the spring leaves, and intercommunicating apertures between the leaves for conducting lubricant from one groove to another, the flow or spread of the lubricant being downward and inward from a lubricant receptacle located near the outer ends of the spring. The leaves of the snubber spring may also be channeled, if desired, as illustrated in the drawing, for lubricating the same between the leaves.

The detail structure of the lubricating means as shown in Figs. 1-5 consists in opposite grooves 22 in each of the spring leaves 1—7, and also as here shown in the leaves of springs 11, the grooves being extended parallel one with the other from one end to the other of the leaves. Intermediate leaves 2-6 inclusive, as best shown in Fig. 2, are grooved on both faces. The lubricant receptacles 23 are located near the outer ends of the lower leaf of the snubber spring assembly 21 and communicate with the opposite grooves 22 of the spring leaves 1—7 by means of apertures 26.

The oil grooves of the lower leaf of the spring assembly, of which both parts are shown in Fig. 3, are closed by transverse walls 28 for forming a small reservoir 25 adjacent the oil receptacle 23 for directing the oil into the apertures 26 of the adjacent spring leaf 1.

The ridge walls 24 and 27 form the contact faces between the spring leaves and being reduced in face area by the channels 22, the frictional action between the leaves is accordingly reduced. Forming the lubricating grooves in both the upper and lower faces of spring leaves 2—6, the grooves being of equal depth, acts to establish the bearing faces of the ridges 24—27 intermediate the bottoms of the opposite grooves. Thus the wear of the faces will not increase their surface contact nor the friction between faces. This arrangement also effects a balanced spring tension on the opposite sides of the leaves.

It is contemplated in the practice of the invention that the springs will be kept well charged with lubricant, the arrangement lending itself effectively for high pressure lubrication if desired. At times when the springs become fouled with devitalized lubricant or with an accumulation of grit, the same may be flushed with kerosene oil for cleansing the grooves and bearing surfaces and then recharged with lubricant.

While the snubber and shock absorber elements and the means for lubricating the springs may be used independently one of the other, the coordination of both features effect an improved spring structure of great merit, being simple and relatively inexpensive in construction, and highly effective in operation.

Having described our invention, we claim:

1. In a vehicle spring, a spring section comprising a plurality of leaves of different lengths, the contacting faces of said leaves having relatively wide opposed grooves, whereby the frictional contact between adjacent leaves is confined to relatively narrow longitudinal sections thereof, each upper leaf having an opening leading to the grooves in the next lower leaf, a supplemental spring assembly arranged above said spring section, having one end connected with but spaced from said spring section near the center of the latter and having its other end bearing on the upper face of said spring section near the outer end thereof, that portion of said spring assembly which bears upon said spring section having its lower face channeled and communicating with the opening in the upper leaf of said spring section, an oil receptacle carried by said spring assembly and communicating with the channeled lower face thereof.

2. In a vehicle spring, a spring section comprising a plurality of leaves of different lengths, the contacting faces of said leaves having relatively wide opposed grooves, whereby the frictional contact between adjacent leaves is confined to relatively narrow longitudinal sections thereof, each upper leaf having an opening leading to the groove in the next lower leaf, a supplemental spring assembly arranged above said spring section, having one end connected with but spaced from said spring section near the center of the latter and having its other end bearing on the upper face of said spring section near the outer end thereof, that portion of said spring assembly which bears upon said spring section having its lower face provided with a recess which is closed on four sides and which communicates with the opening in the upper leaf of said spring section, and an oil receptacle carried by said spring assembly and communicating with the channeled lower face thereof.

In testimony whereof we affix our signatures.

CLARENCE F. CLEMENS.
ALBERT H. KEMPER.